(12) United States Patent
Hsu et al.

(10) Patent No.: US 10,046,609 B2
(45) Date of Patent: Aug. 14, 2018

(54) WRITER FOR TIRE PRESSURE SENSOR

(71) Applicant: MOBILETRON ELECTRONICS CO., LTD., Taichung (TW)

(72) Inventors: Ming-Hung Hsu, Taichung (TW); Chia-Chang Wu, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 195 days.

(21) Appl. No.: 15/274,652

(22) Filed: Sep. 23, 2016

(65) Prior Publication Data
US 2017/0100970 A1 Apr. 13, 2017

(30) Foreign Application Priority Data

Oct. 12, 2015 (TW) .............................. 104133357 A (51) Int. Cl.
| | | |
|---|---|---|
| *B60C 99/00* | (2006.01) | |
| *G01L 17/00* | (2006.01) | |
| *B60C 23/04* | (2006.01) | |
| *G01L 19/14* | (2006.01) | |
| *H01Q 1/22* | (2006.01) | |

(52) U.S. Cl.
CPC ...... *B60C 23/0471* (2013.01); *B60C 23/0408* (2013.01); *B60C 23/0479* (2013.01); *B60C 23/0494* (2013.01); *G01L 19/14* (2013.01); *G01L 17/00* (2013.01); *H01Q 1/2241* (2013.01)

(58) Field of Classification Search
CPC ............ B60C 23/0471; B60C 23/0479; B60C 23/0408; B60C 23/0494; H01Q 1/2241; G01L 17/00
See application file for complete search history.

(56) References Cited

U.S. PATENT DOCUMENTS

| | | | |
|---|---|---|---|
| 8,297,102 B1 * | 10/2012 | Mouchet | B60C 23/0479 73/1.57 |
| 9,922,213 B2 * | 3/2018 | Ishikawa | G06K 7/087 |
| 2005/0007245 A1 * | 1/2005 | Smith | B60C 23/0408 340/442 |

(Continued)

FOREIGN PATENT DOCUMENTS

| | | | |
|---|---|---|---|
| EP | 2810796 A1 * | 12/2014 | ......... B60C 23/0479 |
| WO | WO 2009006518 A1 * | 1/2009 | ......... B60C 23/0408 |

*Primary Examiner* — Lisa Caputo
*Assistant Examiner* — Herbert K Roberts
(74) *Attorney, Agent, or Firm* — Lynette Wylie; Apex Juris, pllc.

(57) ABSTRACT

A writer for a tire pressure sensor is disclosed, which is adapted to hold the tire pressure sensor to write a program to the tire pressure sensor. The tire pressure sensor has a first connection port. The writer includes a housing, a positioning member, and an ejection device. A surface of the housing forms a receiving recess, and a second connection port is provided in the receiving recess. When the tire pressure sensor is received in the receiving recess, the first connection port thereof is connected to the second connection port. The positioning member connected to the housing has a block section abutting against the tire pressure sensor to keep the first connection port being connected to the second connection port. The ejection device is adapted to exert a pushing force on the tire pressure sensor to eject it for separating the second connection port from the first connection port.

4 Claims, 6 Drawing Sheets

(56) References Cited

U.S. PATENT DOCUMENTS

| | | | |
|---|---|---|---|
| 2006/0028331 A1* | 2/2006 | Ito | B60C 23/0408 340/445 |
| 2006/0162436 A1* | 7/2006 | Ito | B60C 23/0408 73/146 |
| 2007/0193348 A1* | 8/2007 | Rutherford | B60C 23/0408 73/146.8 |
| 2008/0164846 A1* | 7/2008 | DeKeuster | B60C 23/04 320/115 |
| 2008/0164988 A1* | 7/2008 | DeKeuster | B60C 23/0408 340/442 |
| 2011/0140876 A1* | 6/2011 | Deniau | B60C 23/0408 340/445 |
| 2012/0112898 A1* | 5/2012 | Yu | B60C 23/0493 340/442 |
| 2013/0309885 A1* | 11/2013 | Liu | H01R 13/629 439/153 |
| 2014/0139332 A1* | 5/2014 | Mouchet | B60C 23/0479 340/442 |
| 2014/0361884 A1* | 12/2014 | Yu | B60C 23/0471 340/447 |
| 2016/0075193 A1* | 3/2016 | Huang | B60C 23/0401 340/447 |
| 2017/0140178 A1* | 5/2017 | Ishikawa | G06K 7/0026 |

* cited by examiner

WRITER FOR TIRE PRESSURE SENSOR

BACKGROUND OF THE INVENTION

1. Technical Field

The present invention generally relates to a tire pressure sensor, and more particularly to a writer for a tire pressure sensor.

2. Description of Related Art

A tire-pressure monitoring system (TPMS) is an electronic system adapted to monitor tire pressure, which uses tire pressure sensors installed at the tires of a vehicle to sense the tire pressure of each tire, and the sensed result is returned to a receiver of the vehicle, providing the real-time condition of each tire.

Typically, the communication protocol or the parameters stored and used in a tire pressure sensor may vary for vehicles manufactured by different manufacturers or with different specifications. In other words, tire pressure sensors compatible with various manufacturers have to use different communication protocols or parameters. Therefore, repair shops or dealers may need to stock various types of tire pressure sensors to meet customer requirements, leading to higher business operating cost.

Therefore, programmable universal tire pressure sensors have come into being, wherein different communication protocols and parameters can be written to the universal tire pressure sensor through a writer to correspond to the various specifications of vehicles. Thus, preparing one single type of programmable universal tire pressure sensor would be just sufficient for repair shops or dealers to satisfy the needs of their customers.

However, the writers available on the market are usually inconvenient to use. In all aspects, how to create a writer for tire pressure sensors which is easy to use has become a main topic in the industry.

BRIEF SUMMARY OF THE INVENTION

In view of the reasons mentioned above, the primary objective of the present invention is to provide a writer for a tire pressure sensor, which could be easy to use.

The present invention provides a writer for a tire pressure sensor, wherein the writer is adapted to hold the tire pressure sensor to write a program to the tire pressure sensor. The tire pressure sensor has a first connection port. The writer includes a housing, a positioning member, and an ejection device. The housing has a receiving recess and a second connection port, wherein the receiving recess is recessed into a surface of the housing, and the second connection port is provided on a bottom of the receiving recess. When the tire pressure sensor is received in the receiving recess, the first connection port of the tire pressure sensor is connected to the second connection port. The positioning member is connected to the housing, and has a block section, wherein a top surface of the block section is an outward curved surface. The positioning member is pivotable between a first position and a second position. When the tire pressure sensor is received in the receiving recess and the positioning member is located in the first position, the block section of the positioning member abuts against the tire pressure sensor, whereby the tire pressure sensor stays inside of the receiving recess. When the positioning member is located in the second position, the block section of the positioning member leaves the tire pressure sensor. The ejection device is adapted to exert a pushing force on the tire pressure sensor, wherein, when the tire pressure sensor is received in the receiving recess and the positioning member is located in the second position, the ejection device ejects the tire pressure sensor to separate the second connection port from the first connection port. The housing has a barrier protruding from a top edge of a sidewall of the receiving recess toward the positioning member. When the tire pressure sensor is received in the receiving recess, the tire pressure sensor abuts against a bottom edge of the barrier. The housing has a pit communicating with the receiving recess. The positioning member has two opposite ends, wherein the block section is at one of the ends, and is hook-shaped, while the other one of the ends is pivotally connected to the housing, so that the positioning member is pivotable between the first position and the second position in the pit.

With the aforementioned design, the tire pressure sensor could be easily inserted into the receiving recess of the writer. The tire pressure sensor could be positioned by the positioning member, which keeps the first connection port of the tire pressure sensor being connected to the second connection port of the writer to write the program to the tire pressure sensor. After that, the positioning member could be moved to the second position, which makes the block section leave the tire pressure sensor, whereby the tire pressure sensor could be automatically ejected by the ejection device to be taken down easily.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
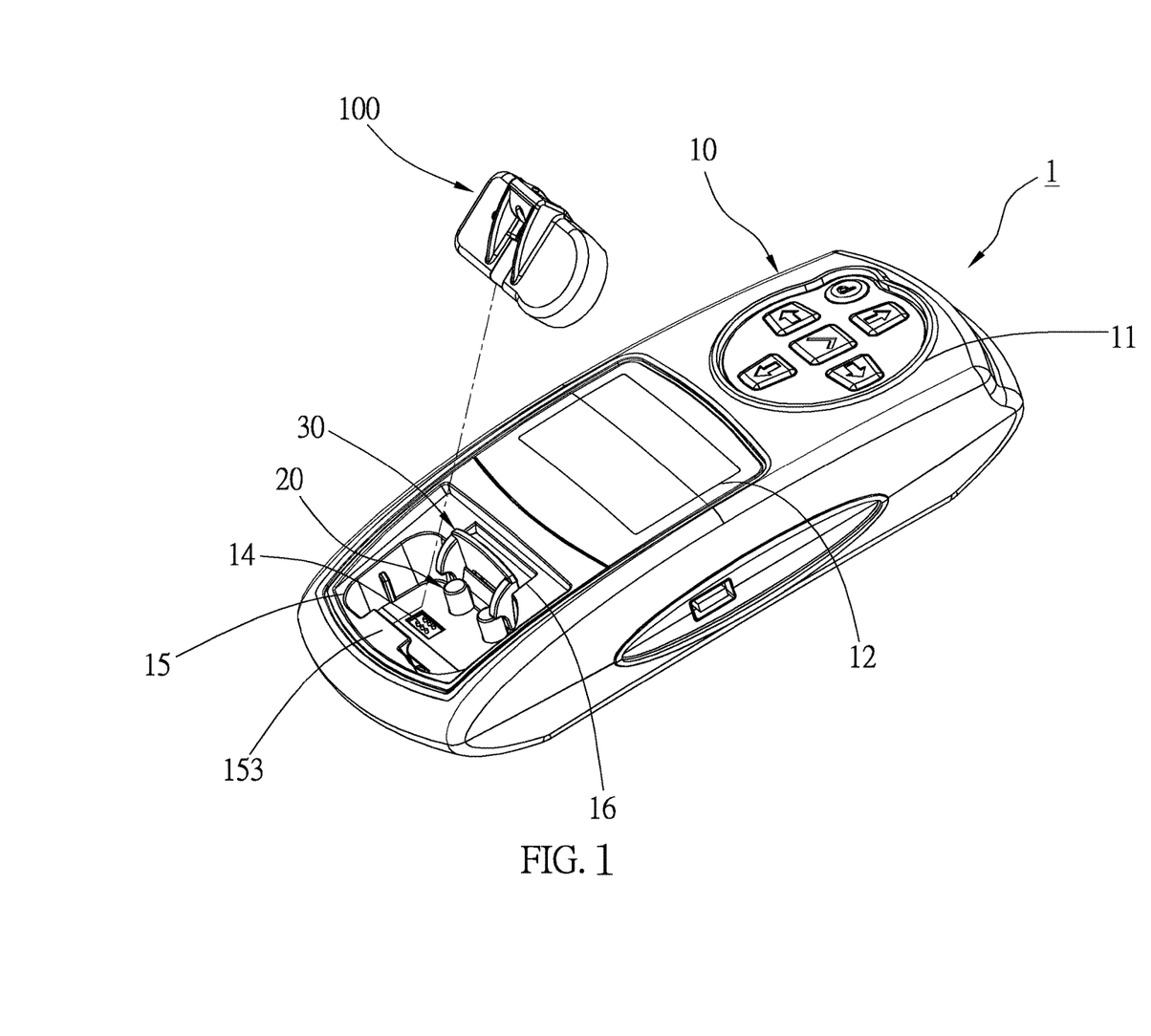
FIG. 1 is a perspective view, showing the tire pressure sensor and the writer of an embodiment of the present invention.
Figure 2:
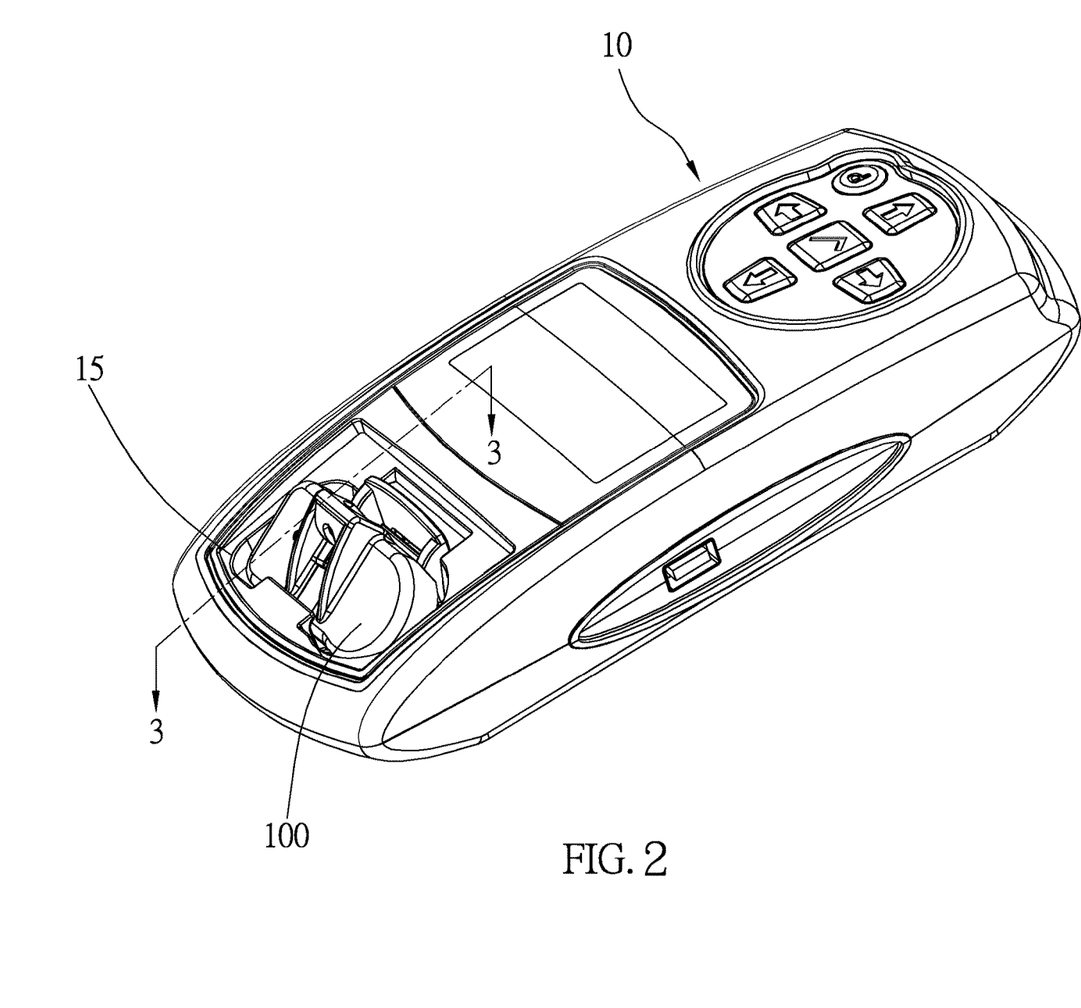
FIG. 2 is a schematic view, showing the tire pressure sensor is put sideways into the receiving recess of the writer of the embodiment of the present invention.
Figure 3:
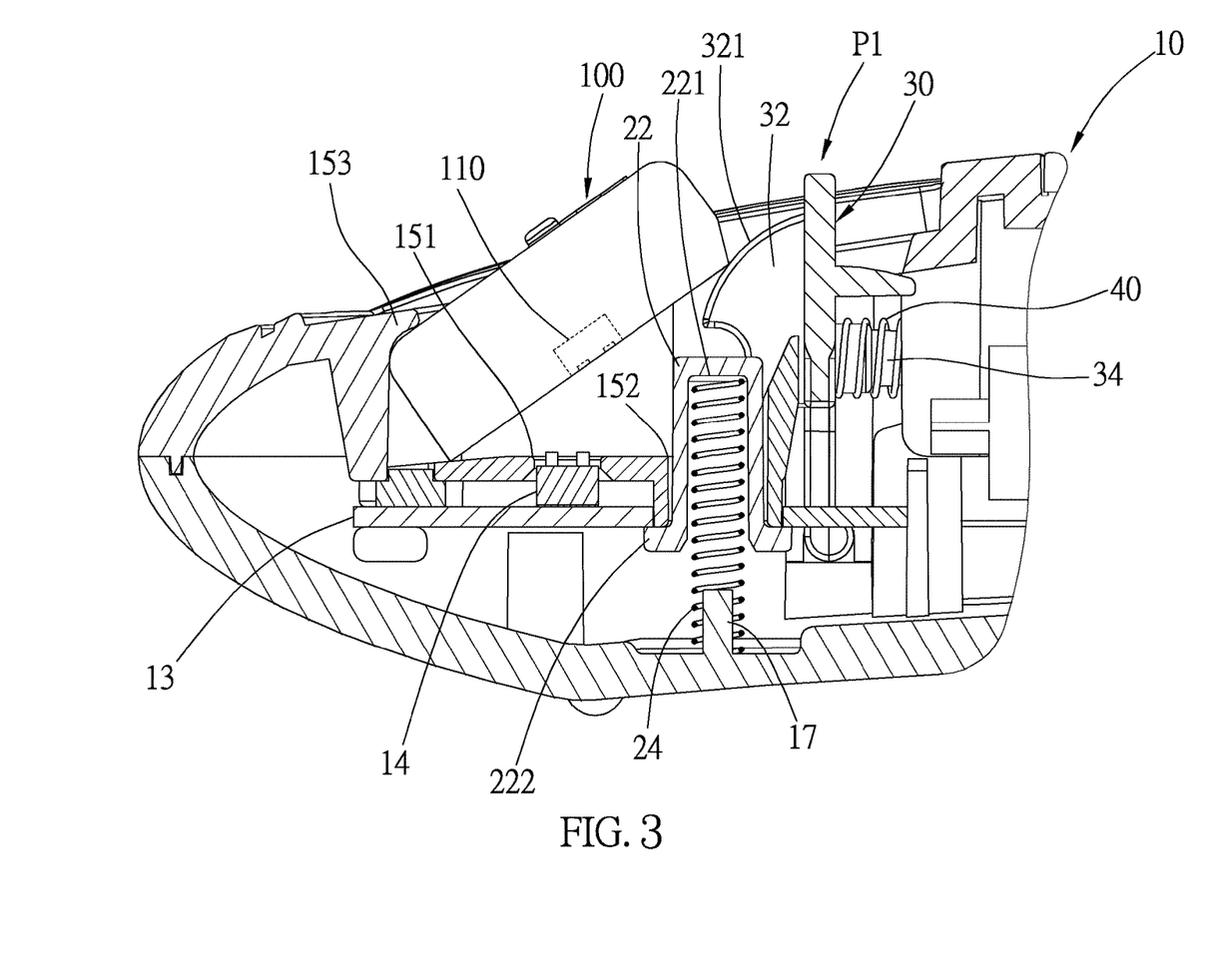
FIG. 3 is a sectional view along the 3-3 line of FIG. 2, showing the positioning member is in the first position.

A writer 1 of an embodiment of the present invention is illustrated in FIG. 1 to FIG. 3, which is adapted to hold a tire pressure sensor 100. The tire pressure sensor 100 has a first connection port 110 which could be electrically connected to the writer 1, whereby a program could be written to the tire pressure sensor 100 from the writer 1, or a piece of digital data could be downloaded from the tire pressure sensor 100. The writer 1 includes a housing 10, an ejection device 20, and a positioning member 30.

A control module 11 and a display module 12 are provided on the housing 10. The control module 11 is adapted to be used to operate the writer 1. In the embodiment, the control module 11 includes a plurality of control buttons. The display module 12 is adapted to display various data about the tire pressure sensor or a system of the tire pressure sensor. In the embodiment, the display module 12 is a liquid crystal display. In addition, said control module 11 could also be a touchscreen which could be operated. The touchscreen is not a limitation of the present invention. A circuit board 13 is provided inside the housing 10. A second connection port 14 is provided on the circuit board 13.

A receiving recess 15 and a pit 16 are recessed into the housing 10, wherein the pit 16 communicates with the receiving recess 15. The housing 10 has a plurality of through holes 151, 152 going through a bottom of the receiving recess 15 to communicate with the inside of the housing 10 and the receiving recess 15. The second connection port 14 extends out from the through hole 151 to be provided on the bottom of the receiving recess. A top edge of a sidewall of the receiving recess 15 is protruded toward the positioning member 20 to form a barrier 153.

The ejection device 20 includes a pair of ejectors 22, and two first elastic members 24 which are compression springs as an example. One of the ejectors 22 and the corresponding one of the first elastic members 24 are used herein for illustration. The ejector 22 is movable, and is provided through the through hole 152. A first positioning portion is provided on a bottom of the ejector 22 to fix one end of the first elastic members 24. In the embodiment, the first positioning portion is a notch 221, which is adapted to receive one of the ends of the first elastic member 24. A second positioning portion is provided inside the housing 10 to fix another end of the first elastic member 24. In the embodiment, the second positioning portion is a post 17, which is adapted to be fitted around by another end of the first elastic member 24. Whereby, the first elastic member 24 would be stably and elastically abut against the ejector 22 and the housing 10, which exerts a pushing force on the ejector 22 to urge the ejector 22 to move upward. In addition, a bottom edge of the ejector 22 forms a block portion 222 to abut against a periphery of the through hole 152 to restrict a movement range of the ejector 22.

In other embodiments, the first position portion is not necessary to be a notch, and the second position portion is not necessary to be a post, as long as the first elastic member 24 could be positioned properly to perform its function. For instance, the first positioning portion could be a post, and the second positioning portion could be a notch, which is just opposite to the aforementioned embodiment.

Figure 6:
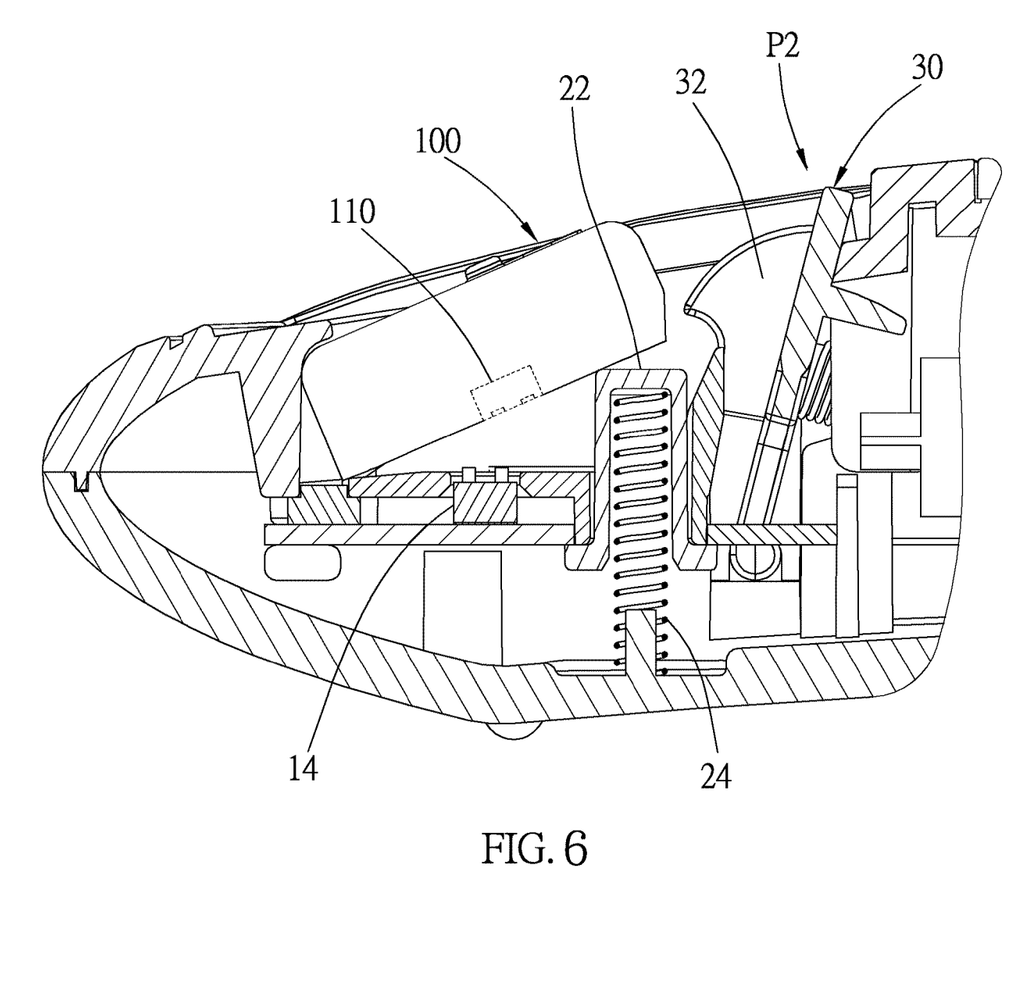
FIG. 6 is a schematic view, showing the positioning member is moved to the second position, which makes the tire pressure sensor be ejected by the ejection device.

The positioning member 30 has two opposite ends. One of the ends forms a—hook-shaped block section 32, wherein the block section 32 faces the receiving recess 15, and a curved surface 321 bulges from a top surface of the block section 32; the other one of the ends is pivotally connected to the housing 10 near the pit 16. The positioning member 30 could pivot between a first position P1 (as shown in FIG. 3) and a second position P2 (as shown in FIG. 6). In addition, a side of the positioning member 30 facing the pit 16 has a protrusion 34. The writer 1 includes a second elastic member 40 provided in the pit 16. The second elastic member 40 has two ends, wherein one of the ends abuts against a side wall of the pit 16, while the other end fits around the protrusion 34 and abuts against the positioning member 30 to provide an elastic force which urges the positioning member 30 to move from the second position P2 toward the first position P1. The protrusion 34 of the positioning member 30 could ensure that an abutting position between the second elastic member 40 and the positioning member 30 is fixed and steady, whereby the second elastic member 40 could properly exert an elastic force on the positioning member 30. However, in other embodiment, if the second elastic member could be directly fixed on the positioning member without the chances of being biased, the protrusion 34 could be also omitted. In other words, the protrusion 34 is not a limitation of the present invention.

Figure 4:
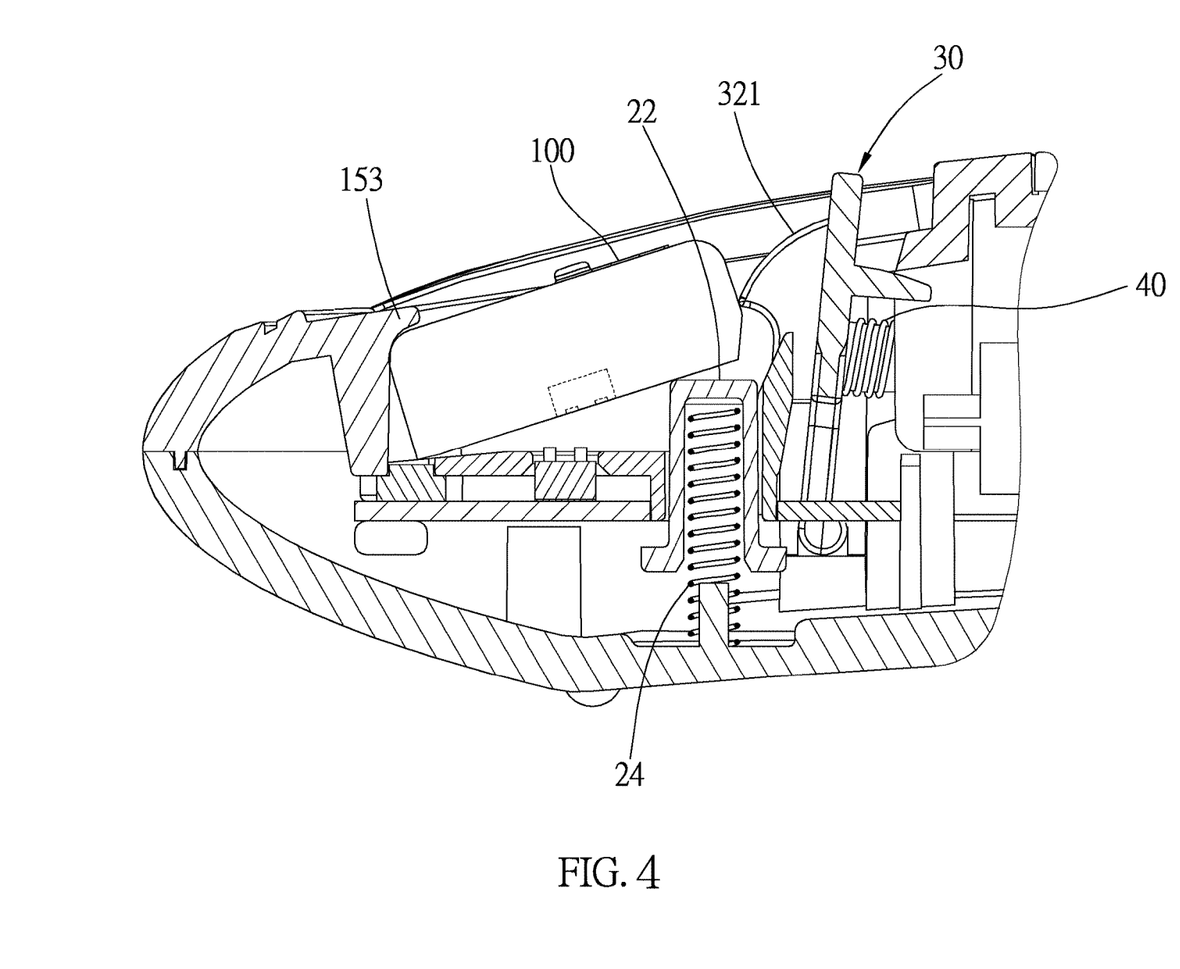
FIG. 4 and FIG. 5 are schematic views, showing the tire pressure sensor is received in the receiving recess of the writer of the embodiment of the present invention.
Figure 5:
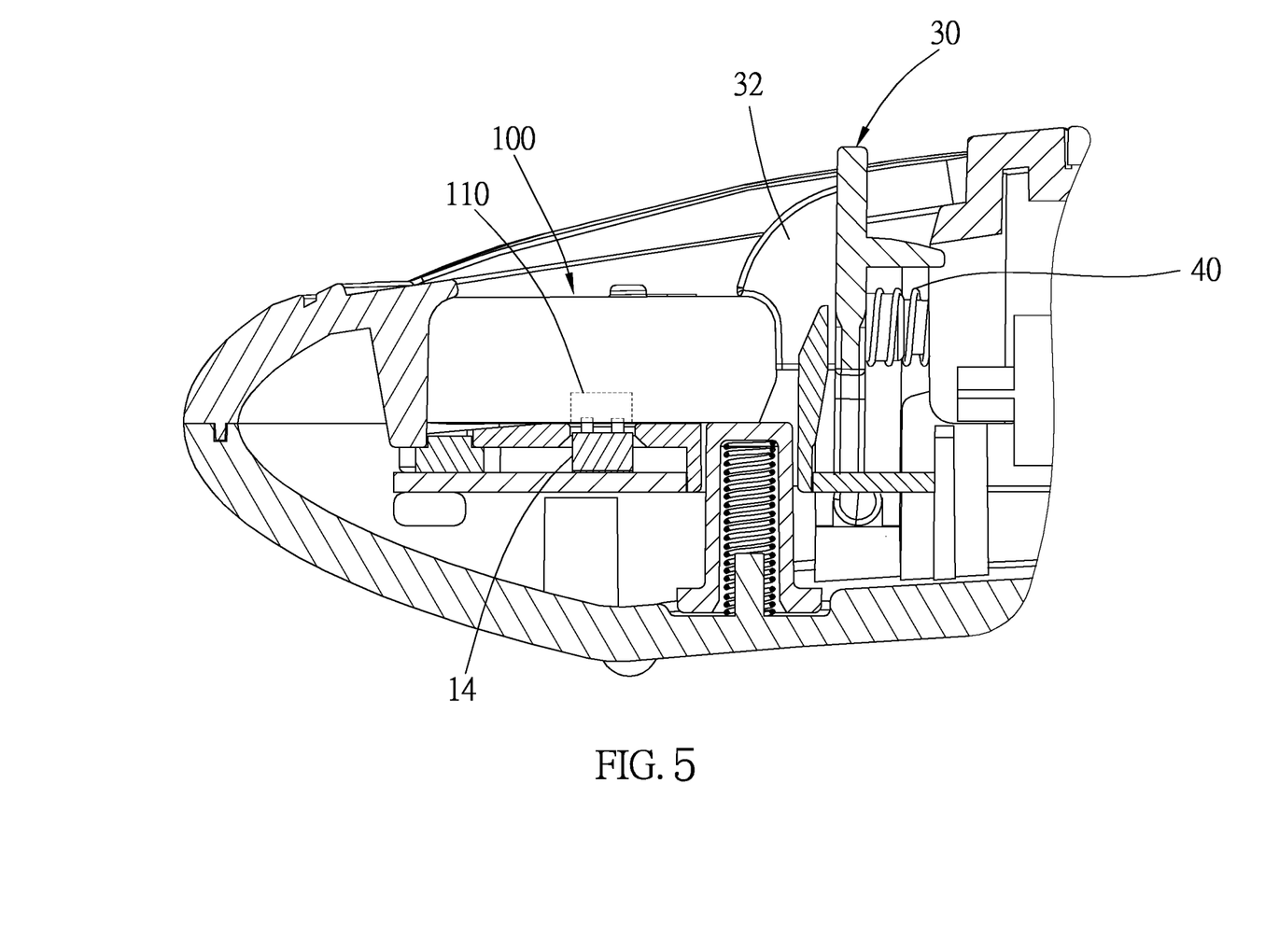

Whereby, when the tire pressure sensor 100 is about to be put into the receiving recess 15 of the writer 1, one side of the tire pressure sensor 100 should be inserted into the receiving recess 15 sideways (as shown in FIG. 1 and FIG. 2), which makes a lateral edge of the tire pressure sensor 100 abut against a bottom edge of the barrier 153 of the receiving recess 15. Another lateral edge of the tire pressure sensor 100 leans lightly against the curved surface 321 of the block section 32 (as shown in FIG. 3). After that, the tire pressure sensor 100 could pivot around where the tire pressure sensor 100 abuts against the barrier 153, and toward the bottom of the receiving recess 15 by exerting a pushing force on an exposed side of the tire pressure sensor 100 toward the bottom of the receiving recess 15, whereby, said side of the tire pressure sensor 100 would slide into the receiving recess 15 along the curved surface 321 of the block section 32, and the positioning member 30 would retreat a little toward the second position P2 to compress the second elastic member 40, which makes the second elastic member 40 store an elastic potential energy (as shown in FIG. 4 and FIG. 5). When the tire pressure sensor 100 slides into the receiving recess 15 to a certain extent, as shown in FIG. 4, a bottom edge of the tire pressure sensor 100 would abut against a top of the ejectors 22 and push the ejectors 22 down to inside of the housing 10. At this time, the first elastic member 24 would be compressed to store an elastic potential energy as well. Then, by keeping pushing down the tire pressure sensor 100 to make the bottom of the tire pressure sensor 100 close to the bottom of the receiving recess 15 (as shown in FIG. 5), the second elastic member 40 would release part of the elastic potential energy, pushing the positioning member 30 to pivot toward the first position P1, whereby the positioning member 30 would abut against the tire pressure sensor 100, and a bottom edge of the block section 32 would substantially abut against the lateral edge and/or the bottom edge of the tire pressure sensor 100. As a result, the tire pressure sensor 100 could stay inside of the receiving recess 15. At this time, the first connection port 110 of the tire pressure sensor 100 would be connected to the second connection port 14 of the writer 1. A user could then use the writer 1 to write the program to the tire pressure sensor 100 through the connection ports 110, 14, or could download the digital data about a tire pressure sensing system from the tire pressure sensor 100.

After that, when the operation is completed, the positioning member 30 could be moved toward the second position P2 to make the block section 32 leave the tire pressure sensor 100, whereby the tire pressure sensor 100 would be ready to be taken down from the writer 1. At this time, the first elastic member 24 of the ejection device 20 would release the elastic potential energy thereof to push up the ejectors 22, which ejects the tire pressure sensor 100, and separates the second connection port 14 from the first connection port 110. Whereby, the tire pressure sensor 100 could be easily taken down from the receiving recess 15 of the writer 1.

With the writer 1 of the present invention, a user could write the program to the tire pressure sensor 100 or download the digital data through the writer 1, wherein the writer 1 for tire pressure sensor 100 would be easy to use even with only one hand.

More specifically, when the tire pressure sensor 100 is about to be put into the receiving recess 15 of the writer 1, the tire pressure sensor 100 could just be inserted into the receiving recess 15 sideways, and the tire pressure sensor 100 would slide into the receiving recess 15 by being slightly pushed down. The tire pressure sensor 100 would be immediately positioned by the positioning member 30 to keep the first connection port 110 of the tire pressure sensor 100 being connected to the second connection port 14 of the writer 1 for preventing the tire pressure sensor 100 from being moved away. When the tire pressure sensor 100 is about to be taken down, the positioning member 30 could just be moved toward the second position P2, and then, the tire pressure sensor 100 would be automatically ejected, which makes the tire pressure sensor 100 easier to taken down. The operation above could be done with just one hand, which could effectively improve the efficiency of the setting or the writing of the tire pressure sensor 100.

It is worth mentioning that, to provide an even force for ejection, the ejectors 22 and the first elastic member 24 are in pairs, but the paired ejectors 22 and the paired first elastic members 24 of the first embodiment are not limitations of the present invention. In other embodiments, the ejector 22 and the first elastic member 24 could be only one or more than two. Also, a compression spring or a contact spring with elastic force could be also provided on the bottom of the receiving recess 15 to eject the tire pressure sensor 100 in other embodiments.

It must be pointed out that the embodiments described above are only some embodiments of the present invention. All equivalent structures which employ the concepts disclosed in this specification and the appended claims should fall within the scope of the present invention.

What is claimed is:

1. A writer for a tire pressure sensor, wherein the writer is adapted to hold the tire pressure sensor to write a program to the tire pressure sensor; the tire pressure sensor has a first connection port; comprising:
    a housing, which has a receiving recess and a second connection port, wherein the receiving recess is recessed into a surface of the housing, and the second connection port is provided on a bottom of the receiving recess; when the tire pressure sensor is received in the receiving recess, the first connection port of the tire pressure sensor is connected to the second connection port;
    a positioning member, which is connected to the housing, and has a block section, wherein a top surface of the block section is an outward curved surface; the positioning member is pivotable between a first position and a second position; when the tire pressure sensor is received in the receiving recess and the positioning member is located in the first position, the block section of the positioning member abuts against the tire pressure sensor, whereby the tire pressure sensor stays inside of the receiving recess; when the positioning member is located in the second position, the block section of the positioning member leaves the tire pressure sensor; and
    an ejection device, which is adapted to exert a pushing force on the tire pressure sensor, wherein, when the tire pressure sensor is received in the receiving recess and the positioning member is located in the second position, the ejection device ejects the tire pressure sensor to separate the second connection port from the first connection port;
    wherein the housing has a barrier protruding from a top edge of a sidewall of the receiving recess toward the positioning member; when the tire pressure sensor is received in the receiving recess, the tire pressure sensor abuts against a bottom edge of the barrier;
    wherein the housing has a pit communicating with the receiving recess; the positioning member has two opposite ends, wherein the block section is at one of the ends, and is hook-shaped, while the other one of the ends is pivotally connected to the housing, so that the positioning member is pivotable between the first position and the second position in the pit.

2. The writer of claim 1, wherein the housing has a through hole going through a bottom of the receiving recess to communicate with the receiving recess and inside of the housing; the ejection device comprises an ejector and a first elastic member; the ejector is movable, and is provided through the through hole; a bottom edge of the ejector forms a block portion; the first elastic member is provided inside the housing, wherein the first elastic member exerts a pushing force on the ejector to urge the ejector to move upward; the block portion of the ejector abuts against a periphery of the through hole to restrict a movement range of the ejector.

3. The writer of claim 2, wherein the bottom of the ejector has a notch; a protrusion is provided inside the housing; the first elastic member has two ends, wherein one of the ends is provided in the notch, while another end fits around the protrusion.

4. The writer of claim 1, further comprises a second elastic member provided in the pit, and each end of the second elastic member respectively abuts against a side wall of the positioning member and a side wall of the pit; the second elastic member exerts an elastic force, which urges the positioning member to move from the second position toward the first position.

* * * * *